United States Patent
Van Loef et al.

(10) Patent No.: US 9,296,945 B2
(45) Date of Patent: Mar. 29, 2016

(54) PLASTIC SCINTILLATORS

(71) Applicant: Radiation Monitoring Devices, Inc., Watertown, MA (US)

(72) Inventors: Edgar V. Van Loef, Watertown, MA (US); Kanai S. Shah, Watertown, MA (US); Gary Markosyan, Framingham, MA (US)

(73) Assignee: Radiation Monitoring Devices, Inc., Watertown, MA (US)

( * ) Notice: Subject to any disclaimer, the term of this patent is extended or adjusted under 35 U.S.C. 154(b) by 0 days.

(21) Appl. No.: 14/250,643

(22) Filed: Apr. 11, 2014

(65) Prior Publication Data

US 2014/0332689 A1    Nov. 13, 2014

Related U.S. Application Data

(60) Provisional application No. 61/811,226, filed on Apr. 12, 2013.

(51) Int. Cl.
| | |
|---|---|
| *G01T 1/10* | (2006.01) |
| *C09K 11/06* | (2006.01) |
| *G01T 3/06* | (2006.01) |
| *G01T 1/203* | (2006.01) |

(52) U.S. Cl.
CPC .............. *C09K 11/06* (2013.01); *G01T 1/203* (2013.01); *G01T 3/06* (2013.01)

(58) Field of Classification Search
CPC ....................................................... G01T 1/202
USPC ............................................................ 250/362
See application file for complete search history.

(56) References Cited

U.S. PATENT DOCUMENTS

| | | | |
|---|---|---|---|
| 3,121,122 A | 2/1964 | Reimlinger | |
| 3,244,637 A * | 4/1966 | Tsou et al. | 252/301.18 |
| 3,758,412 A | 9/1973 | Grum et al. | |
| 3,898,460 A * | 8/1975 | Noakes et al. | 250/328 |
| 4,262,202 A | 4/1981 | Cusano et al. | |
| 4,358,401 A * | 11/1982 | O'Brien et al. | 588/8 |
| 4,594,179 A | 6/1986 | Harrah et al. | |
| 4,713,198 A * | 12/1987 | Simonetti | 252/301.17 |
| 5,294,509 A | 3/1994 | Ashiya et al. | |
| 5,606,638 A * | 2/1997 | Tymianski et al. | 385/143 |
| 7,186,987 B1 | 3/2007 | Doty et al. | |
| 2001/0006214 A1 | 7/2001 | Boerner et al. | |
| 2007/0001123 A1* | 1/2007 | Andrews et al. | 250/394 |
| 2010/0102242 A1 | 4/2010 | Burr et al. | |
| 2011/0163327 A1 | 7/2011 | Ueno et al. | |
| 2012/0161011 A1 | 6/2012 | Menge et al. | |
| 2014/0027646 A1 | 1/2014 | Zaitseva et al. | |

FOREIGN PATENT DOCUMENTS

JP    2005-200460 A    7/2005

OTHER PUBLICATIONS

Zaitseva et al., Plastic scintillators with efficient neutron/gamma pulse shape discrimination. Nuclear Instruments and Methods in Physics Research. 2012;668:88-93.

* cited by examiner

*Primary Examiner* — Kiho Kim
(74) *Attorney, Agent, or Firm* — Wolf, Greenfield & Sacks, P.C.

(57) ABSTRACT

Compositions, methods, and systems related to plastic scintillating materials based on a polymer including an aromatic ring structure combined with an oxazole and a cross-linker are disclosed. The disclosed plastic scintillator materials may advantageously provide gamma-neutron pulse shape discrimination capabilities.

16 Claims, 7 Drawing Sheets

PLASTIC SCINTILLATORS

RELATED APPLICATIONS

This application claims priority to U.S. Provisional Application No. 61/811,226, filed Apr. 12, 2013, which is incorporated herein by reference in its entirety.

FIELD OF INVENTION

The disclosure relates generally to scintillator technology and corresponding systems and methods.

BACKGROUND

Scintillators are widely used detectors for spectroscopy of energetic photons (e.g. X-rays and gamma-rays) as well as neutrons. These detectors are commonly used in nuclear and high energy physics research, medical imaging, diffraction, non-destructive testing, geological exploration, and other applications. Important properties for the scintillation crystals used in these applications include high light output, high gamma ray stopping efficiency (attenuation), fast response, low cost, good proportionality, minimal afterglow, and/or pulse shape discrimination. Thus, there is continued interest in the search for scintillator materials that have these properties.

At present, scintillation detectors based on commercially available organic liquids or plastics are often used for the detection of neutrons. These scintillators due to their high hydrogen content provide neutron detection via proton recoil. While these scintillators show fast response and are available in large sizes at relatively low cost, they have several performance limitations. Liquid scintillators provide neutron/gamma pulse shape discrimination (PSD) but they are based on organic compounds and have relatively low flash points (in some cases as low as 24° C.) and they can be relatively bulky and cumbersome to handle. The main limitation of current plastic scintillator materials for neutron detection is their inability to provide effective gamma-neutron discrimination on the basis of pulse shapes.

SUMMARY

Plastic scintillating materials as well as corresponding methods and systems are described.

In one embodiment, a scintillator material includes a polymer including an aromatic ring structure. The scintillator material also includes an oxazole. The scintillator material includes between about 10 to 40 weight percent of the oxazole. Additionally, the scintillator material includes a cross-linker. The scintillator material includes less than about 2 weight percent of the cross-linker. In some embodiments, the cross-linker links at least a first chain of the polymer to a second chain of the polymer.

In another embodiment, a system for detecting radiation includes a detector with a scintillator material. The scintillator material includes a polymer with an aromatic ring structure, an oxazole, and a cross-linker. The scintillator material includes between about 10 to 40 weight percent of the oxazole and less than about 2 weight percent of the cross-linker. In some embodiments, the cross-linker links at least a first chain of the polymer to a second chain of the polymer. The detector also includes a light detector assembly coupled to the scintillator material to detect a light pulse luminescence from the scintillator material.

In yet another embodiment, a method of radiation detection includes: providing a detection system comprising: a scintillator material comprising a polymer including an aromatic ring, an oxazole, and a cross-linker, wherein the scintillator material comprises between about 10 to 40 weight percent of the oxazole, and wherein the scintillator material comprises less than about 2 weight percent of the cross-linker; and a detection assembly coupled to the scintillator material to detect a light pulse luminescence from the scintillator as a measure of a scintillation event; positioning the system such that a radiation source is within a field of view of the system so as to detect emissions from the source; and measuring a scintillation event luminescence signal from the scintillator material with the detection assembly. In some embodiments, the cross-linker links at least a first chain of the polymer to a second chain of the polymer.

It should be appreciated that the foregoing concepts, and additional concepts discussed below, may be arranged in any suitable combination, as the present disclosure is not limited in this respect.

The foregoing and other aspects, embodiments, and features of the present teachings can be more fully understood from the following description in conjunction with the accompanying drawings.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1A:
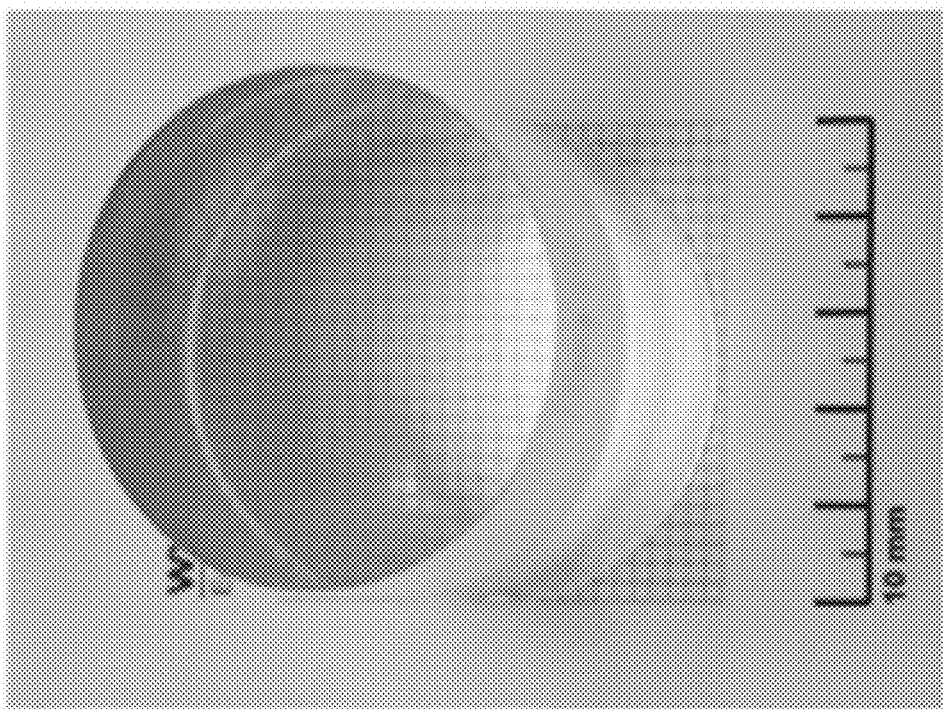
FIG. 1A photograph of an exemplary plastic scintillator under ambient illumination.

The inventors have recognized several limitations with previous plastic scintillator materials. For example, certain plastic scintillators exhibit an inability to provide effective gamma-neutron discrimination on the basis of pulse shapes and suffer from mechanical issues such as being soft and deformable. Consequently, the inventors have recognized the advantages of providing a plastic scintillator capable of discriminating gamma radiation and neutrons with improved mechanical properties. Such materials may offer both versatile and cheap radiation detectors. As described in more detail below, embodiments incorporating polymers with an aromatic ring structure, high concentrations of a scintillating additive (e.g., an oxazole), and a cross-linker may be used to provide such a material.

In one embodiment, the plastic scintillator includes a polymer with an aromatic ring structure. Depending on the embodiment, possible polymers include, but are not limited to at least one of polystyrene and vinyl toluene. However, it should be understood that other polymers are also possible. In addition, embodiments in which a combination of polymers are used are also envisioned. Depending upon the particular scintillation mechanism present in the resulting plastic scintillator, it may be advantageous in some embodiments to remove free oxygen prior to polymerization by bubbling argon through the material and subsequently providing a vacuum to remove ambient air including oxygen from the material. Without wishing to be bound by theory, in some embodiments, carbonyl may interfere with the scintillation properties of the resulting plastic scintillators. Thus, in some embodiments, the monomer, or polymer, maybe substantially free from carbonyl.

In a related embodiment, the above-noted polymer is doped with an appropriate scintillating additive. In one particular embodiment, an oxazole is used to dope the polymer to provide the desired scintillating properties. It should be understood that any number of different types of oxazoles might be used. For example, in one embodiment, the oxazole may be PPO (2,5-diphenyloxazole). Advantageously, and as described in more detail below in the examples, plastic scintillators made with PPO have an emission that matches bialkali photomultipliers ($\lambda \sim 425$ nm), exhibit a fast scintillation decay, provide good light yield, and exhibit excellent neutron-gamma PSD. Consequently, plastic scintillators incorporating PPO may be easily integrated into systems for detecting radiation.

In one embodiment, the scintillating additive is present in any appropriate concentration up to and including the solubility limit of the scintillating additive in the resulting polymer. For example, in several nonlimiting embodiments, an oxazole may be present in a concentration between about 10 to 40 weight percent, 20 to 30 weight percent, or any other appropriate concentration. While many embodiments may include a concentration of the scintillating additive that is less than, or equal to, the solubility limit in the resulting polymer, embodiments in which the scintillating additive is present in a concentration greater than the solubility limit are also possible.

Without wishing to be bound by theory, in one embodiment, the scintillating additive may be interstially located between adjacent polymer chains as is the case with PPO. In other embodiments, the scintillating additive may act as a block co-polymer and may be integrated into the polymer chains in the final polymerized material. Regardless of the method in which the scintillating additive is integrated, the scintillating additive may remain in solution. However, the current disclosure is not limited in this fashion. In some embodiments, a portion of the scintillating additive may be partially soluble, or even insoluble, with the base composition.

As noted above, in addition to scintillating additive, the plastic scintillator may also include a cross-linker appropriate for the particular polymer incorporated in the plastic scintillator. For example, in one embodiment, the cross-linker includes two vinyl groups. In another embodiment, the cross-linker includes an aromatic ring structure. Without wishing to be bound by theory, this may help to enhance the scintillation properties of the resulting plastic scintillator. In one particular embodiment, the cross-linker is divinyl benzene.

The cross-linker may also be present in any appropriate amount. For example, the cross-linker may be present in the scintillator material in a concentration of less than about 2 weight percent, between about 0.001 to 2 weight percent, between about 0.1 to 1.0 weight percent, or between about 0.2 to 0.4 weight percent. The particular concentration of the cross-linker may be selected for any number of reasons. For example, in one embodiment, the concentration of the cross-linker may be less than a preselected concentration to substantially prevent the formation of cracks in the final resulting scintillator material.

A cross-link is a bond that links one polymer chain to another. The bond may be a covalent bond or an ionic bond. A cross-linker generally refers to a substance that forms bonds (i.e., links) between polymer chains. In some embodiments, a cross-linker forms bonds between chains of the same polymer (e.g., the cross-linker links at least a first chain of a polymer to a second chain of the polymer). For example, in embodiments where the polymer comprises polystyrene, divinylbenzene may be used as a cross-linker to form covalent bonds between at least two polystyrene chains. In certain cases, a covalently cross-linked polystyrene matrix may be formed. In some embodiments, a cross-linker forms bonds between chains of at least two different polymers (e.g., the cross-linker links at least a chain of a first polymer to a chain of a second, different polymer). When polymer chains are linked together, they lose some of their ability to move/rotate as individual polymer chains. It is known that cross-linking in certain plastic scintillators including relatively low concentrations of the scintillating additive leads to an alteration of the energy transfer mechanism and causes excited electrons to relax to the ground state through non-radiative decay. As a result, the light yield of a cross-linked standard plastic scintillator is reduced. However, during the development of the current plastic scintillators, and as described in more detail in the examples, it was discovered that rapid polymerization in combination with relatively high concentrations of the scintillating additive with the use of for example divinylbenzene as a cross-linking agent actually led to an increase in the light yield (+20%) and provided pulse/shape discrimination capabilities for the resulting plastic scintillators.

Without wishing to be bound by theory, the above-noted phenomenon can be explained by the physics of the cross-linking process in an environment of high PPO concentrations, as cross-linking allows for: a more uniform distribution of PPO molecules; restraint of the PPO molecules by the polystyrene macromolecules leading to less "silvering" (leaching out of molecules); and better thermal and mechanical properties due to the creation of a 3D network.

In at least one embodiment, the plastic scintillator may include other additives or wavelength shifters in addition to the oxazole present in the plastic scintillator. Alternatively, in another embodiment, a portion of the oxazole might be replaced with one or more additives or wavelength shifters. Possible additional additives and wavelength shifters include, but are not limited to, at least one of naphthalene, dimethylnaphthalene, vinylnaphthalene, diphenyloxadiazole (PPD), methylstyrylbenzene (MSB), bis-MSB, p-terphenyl, anthracene, and diphenylanthracene (DPA), POPOP (1,4-bis [5-phenyloxazol-2-yl]), PMP (1-phenyl-3-mesityl-2-pyrazoline), FIrpic (Bis(2-(4,6-difluorophenyl)pyridinato-N,C2'), and/or picolinate iridium(III)). While the above additives and wavelength shifters have been disclosed, it is envisioned that other suitable additives and wavelength shifters could also be used. Similarly, the additives and wavelength shifters may be added to the composition in suitable weight percentages for their intended purpose. For example, the above additives and wavelength shifters may be present in a range of about 0-5 weight percent.

Figure 8:
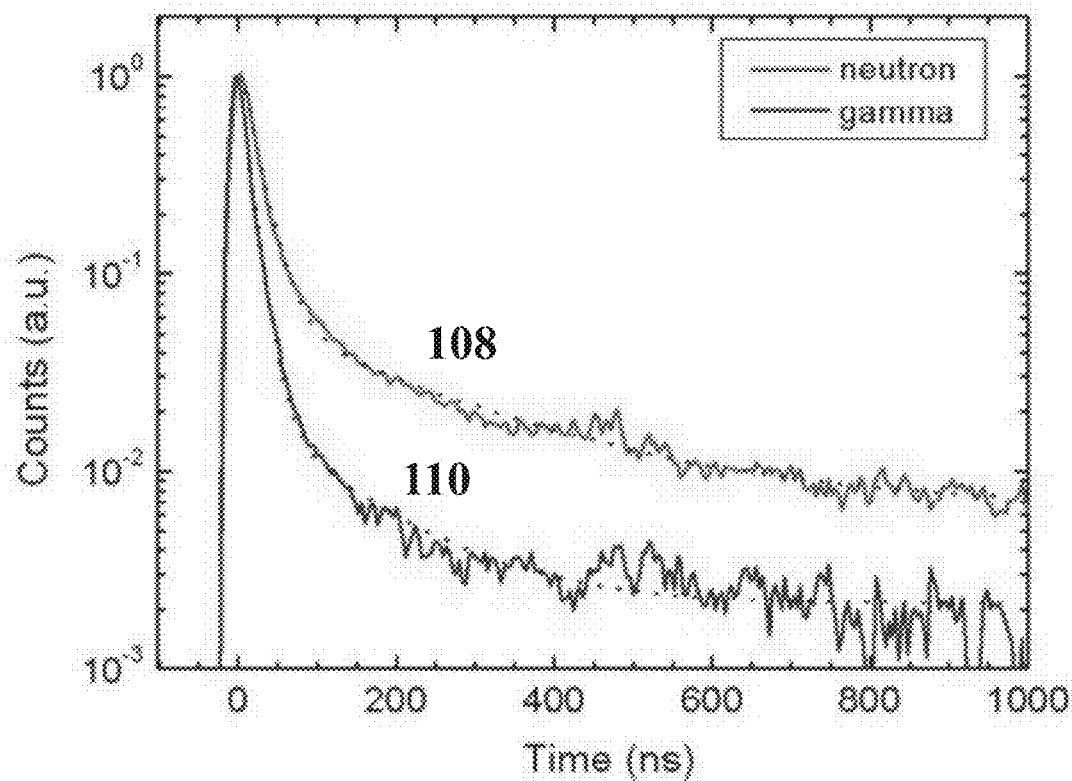
FIG. 8 is a graph of scintillation decay of a polystyrene plastic scintillator with 10% naphthalene, 0.1% PPO and 0.1% POPOP under gamma-ray and neutron excitation.

One of the valuable characteristics of at least some of the embodiments of the presently disclosed plastic scintillators is the ability to differentiate neutrons from gamma rays. The principle behind discrimination is described with reference to FIGS. 8-10. FIG. 8 shows the time course of light emission by gamma rays 110 and neutrons 108 from a plastic scintillator. As can be seen, the timing profile of a gamma-ray scintillation event differs compared to a neutron scintillation event. For incident gamma-rays, scintillation is very fast, including a fast light decay. The neutron scintillation event exhibits a relatively slower timing profile. The difference in the timing profile between gamma-ray scintillation events and neutron scintillation events can facilitate differentiation between gamma-ray detection and neutron detection. In particular, such differences enable gamma-ray detection and neutron detection to be differentiated using pulse shape discrimination (PSD) analysis. PSD analysis, in general, involves comparing the luminescence signal pulse shape resulting from gamma-ray detection to the luminescence signal pulse shape resulting from neutron detection. In some embodiments, it may be advantageous to use PSD analysis over relatively long time periods to differentiate gamma-ray detection and neutron detection. Relatively long PSD times are particularly useful in embodiments when the scintillator is relatively thick, for example, greater than 1 cm, greater than 5 cm, etc.

Figure 9:
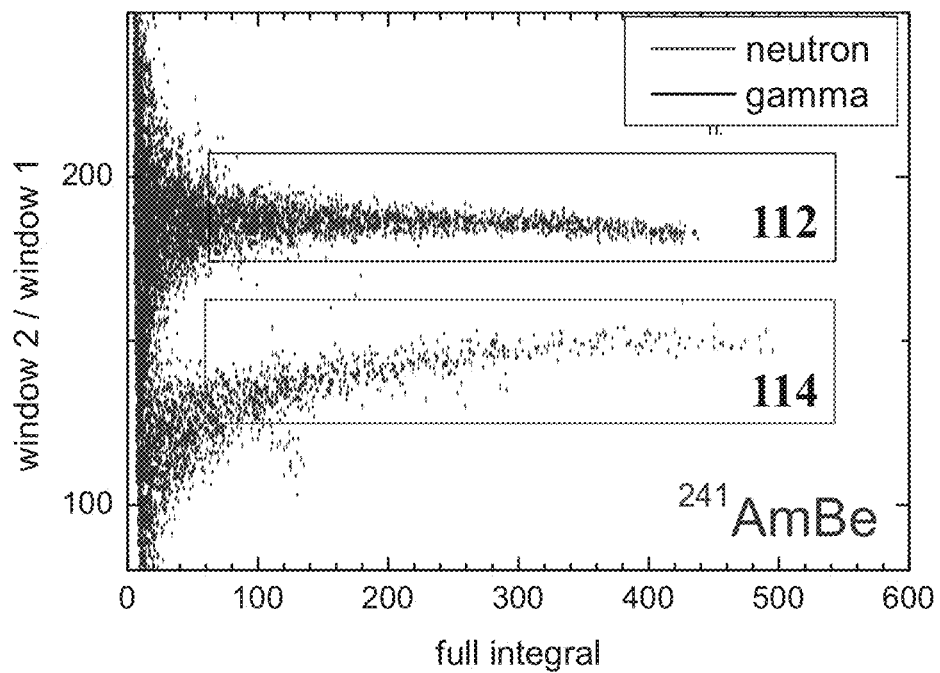
FIG. 9 is a graph of a pulse shape discrimination scatter plot of a plastic scintillator with 30% PPO and 1% Divinylbenzene.

FIG. 9 shows the scatter plot for a polystyrene plastic incorporating 30% PPO and 1% Divinylbenzene. To obtain a numerical expression of the PSD performance the figure of merit (FOM) was calculated. It is defined from the PSD histogram (intensity plot of the ratio of the TI and FI). The FOM is calculated from the PSD histograms as a ratio of the sum of full width at the half maximum (FWHM) for the gamma and neutron distributions and the distance between the peak positions (PP) of the distributions:

$$FOM = (FWHM_{gamma} + FWHM_{neutron}) / (PP_{neutron} - PP_{gamma})$$

Figure 10:
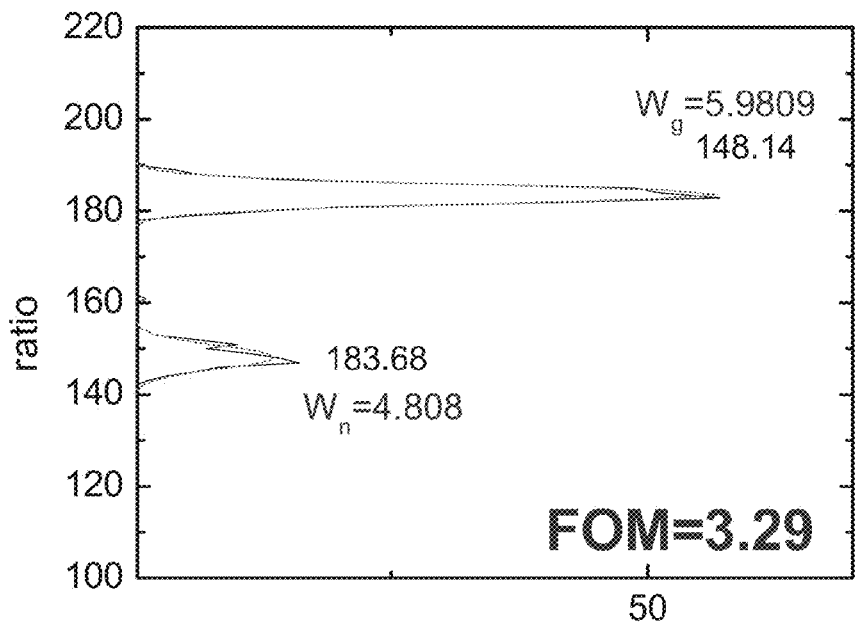
FIG. 10 is a graph of the figure of merit (FOM) of a polystyrene plastic scintillator with 30% PPO and 1% Divinylbenzene.

The calculation using the above formula and resulting FOM of 3.29 for the plastic scintillator of FIG. 9 is illustrated in FIG. 10.

Standard plastic curing and molding techniques may be applied to the above compositions to make low cost large size detectors. In some embodiments, the associated polymerization equipment may operate around room temperature, though elevated curing temperatures are also possible. Therefore, the container material and other components may be exposed to relatively benign conditions. Thus polymerization may allow the use of cheap and simple equipment and many runs can be conducted with minimal use of expendable components. Another point in favor of using polymerization techniques is power utilization. Since polymerization generally occurs relatively close to room temperature, only a few watts of operational power may be required. Furthermore, the use of polymerization may enable the production of samples in the size range of 5 to 20 cm$^3$ though both larger and smaller sample sizes may also be obtained. In view of the above, using polymerization techniques for manufacturing the above disclosed scintillating materials may be an attractive manufacturing method.

In one embodiment, the initial steps of fabricating the plastic scintillating material may be the preparation and filtration of the monomers to be used. Specifically, the monomers may be treated and/or filtered to remove small particulates and inhibitors present. In one embodiment, a glass column with activated alumina may be used to treat and filter the material, though other activated materials may be used. The material may slowly pass through the column. Subsequently, the inhibitor may be removed using a chromatography process while the pure monomer may be collected at the bottom of the column in a clean beaker. Vacuum distillation or a zone refining process can also be used for initial material purification. After initial purification, the oxazole, or other appropriate scintillating additive may be dissolved, or otherwise added, to the monomer. In addition to the oxazole, in some embodiments, a cross-linker as described above is also added to the monomers, or polymers. Depending on the embodiment, additional scintillating additives might be added to the monomers, or polymers, as well.

After combining the monomers, or polymers, with the dopants and additives, the material may be polymerized using thermal, anionic, cationic, or any other applicable polymerization technique. In one embodiment, anionic polymerization may be performed using 2,2'-azo-bis-isobutyrylnitrile (AIBN), benzoylperoxide, or other appropriate initiators. In another embodiment, thermal polymerization may be preferred. Thermal polymerization may be performed at temperatures between 30 to 140° C. for a period of 4 to 6 days, depending on the size and volume of the plastic scintillator material to be made. For example, in one embodiment, the polymerization may be performed at about 50°. Thermal polymerization may be done under oxygen-free conditions and at temperatures that do not allow the monomer to boil. Further, in some embodiments prior to polymerization, argon may be bubbled through the monomers, or polymers, prior to sealing and pumping to further reduce oxygen in the resulting material. Should bubbles appear in the monomer/polymer, the temperature and/or pressure may be adjusted depending on the type and degree of polymerization to substantially eliminate the bubbles in the specimen. The container holding the material may provide homogeneous heat distribution throughout (i.e. may be heated evenly) to prevent uneven and/or excessive localized polymerization. Uneven heat distribution may lead to gas bubble formation and excessive laminar pressure which could prevent bubbles from floating to the top and escaping. In some embodiments, it may be desirable to monitor the progress of polymerization daily in order to determine whether the process has been fully completed. Post-processing operations such as cutting, grinding, polishing, heat treatment and other applicable processes may be conducted after the polymerization process is complete to obtain a transparent and optically clear sample.

The plastic scintillator material compositions described herein may be used in detectors. The detector may include one or more scintillators optically coupled to a light detector assembly, such as a light photodetector, or imaging device, or other appropriate light sensitive detector. The detector assembly may include a data analysis system to process information from the scintillator and light sensitive detector. Non-limiting examples of a light detector assembly include photomultiplier tubes (PMT), photodiodes, CCD sensors, image intensifiers, and the like. Choice of a particular light detector assembly will depend in part on the type of radiation detector being fabricated and on its intended use of the device. In certain embodiments, the photodetector may be position-sensitive. In use, the detector detects energetic radiation emitted from a source.

The detector assemblies themselves, which can may include the plastic scintillator material and the light detector assembly, may be connected to a variety of tools and devices. Non-limiting examples include monitoring and detection devices, well-logging tools, and imaging devices such as X-ray CT, X-ray fluoroscopy, X-ray cameras (such as for security uses), PET, and other nuclear medical imaging or detection devices. The above examples are merely illustrative of the types of application the current composition may be used for and should not be interpreted to limit the use of the present material in other appropriate applications. Various technologies for operably coupling or integrating a radiation detector assembly containing a scintillator to a detection device may be utilized.

A data analysis system may be coupled to the detector. The data analysis system may include, for example, a module or system to process information (e.g., radiation detection information) from the detector/light detector assembly. The data analysis system may also include, for example, a wide variety of proprietary or commercially available computers, electronics, systems having one or more processing structures, or the like. The systems may have data processing hardware and/or software configured to implement any one (or combination of) the method steps described herein. The methods may further be embodied as programming instructions in a tangible non-transitory media such as a memory, a digital or optical recording media, or other appropriate device.

Example 1

Multiple plastic scintillators were fabricated from styrene monomer containing 0-5 weight percent napthalene and 10-30 weight percent PPO.

Polymerization of the monomers was performed at temperatures between 30 to 140° C. for a period of up to several weeks, depending on the size and volume of the plastic scintillator. The polymerization was performed under oxygen-free conditions and at temperatures that did not allow the monomer to boil. When bubbles appeared in the liquid, the temperature and pressure of the equipment was adjusted depending on the type and polymerization degree of the specimen. The progress of polymerization was monitored daily until the fabrication of the plastic scintillator was completed.

After completion of the polymerization, the polymers (plastic scintillators) were removed from their glass ampoules, vials or containers. In the case of a glass ampoule, a cutting station was used to open the ampoule. First, a circular cut was made with a diamond-blade around the glass ampoule just above the top of the plastic. Next, a point was softly tapped on the cut until a crack in the glass ampoule appeared. By tapping around and towards the end of the glass ampoule, the glass broke away from the plastic scintillator and the plastic scintillator was subsequently removed. Removal of the plastic scintillators from vials or other containers was simply performed by opening the cap of the vial/container and tapping at the bottom of the vial/container.

Subsequently, the plastic scintillators were polished on a disc/belt grinder with 240 grit pads and water cooling. Next, the plastic scintillators were manually ground with fine 600 grit paper. The final polish was done with a polymer cloth and polishing suspension. After the polishing, the plastic scintillators were optically inspected (by eye) for any surface scratches or inhomogeneities.

Figure 1B:
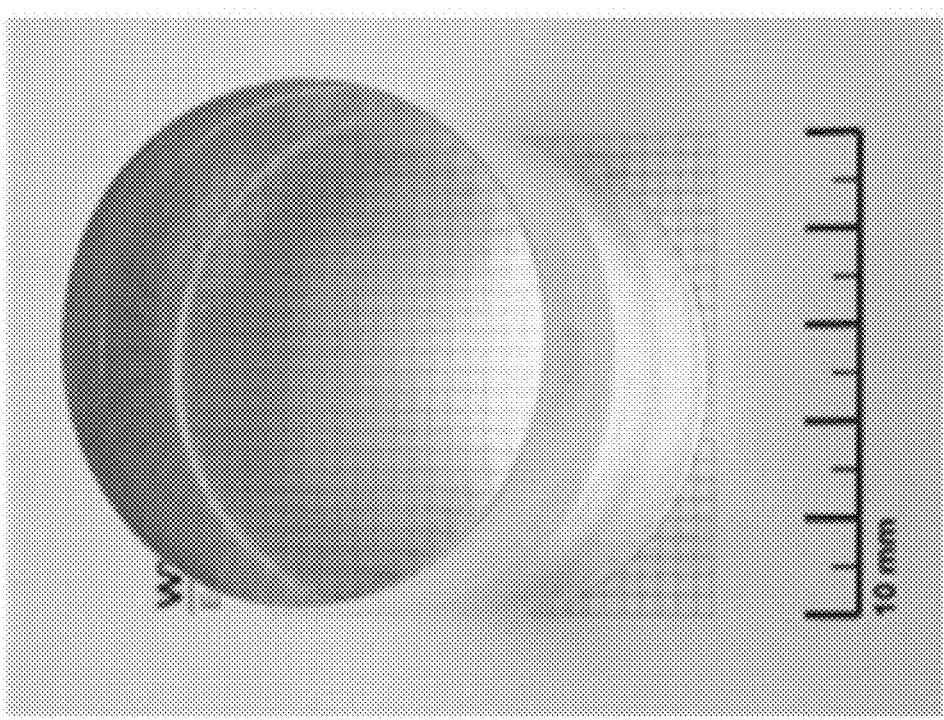
FIG. 1B photograph of an exemplary plastic scintillator under UV illumination.

One example of the prepared plastic scintillators is presented in FIGS. 1A and 1B under ambient light and ultraviolet light respectively.

Example 2

Figure 2:
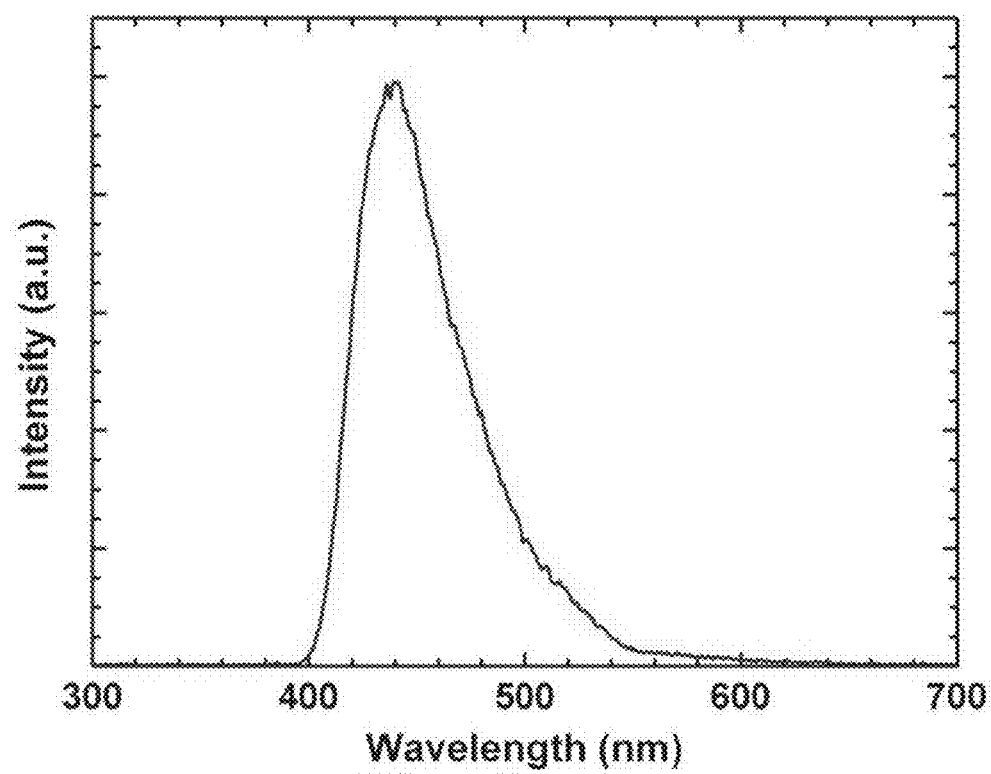
FIG. 2 is a radioluminescence emission spectrum of a polystyrene plastic scintillator doped with 30% PPO.
Figure 3:
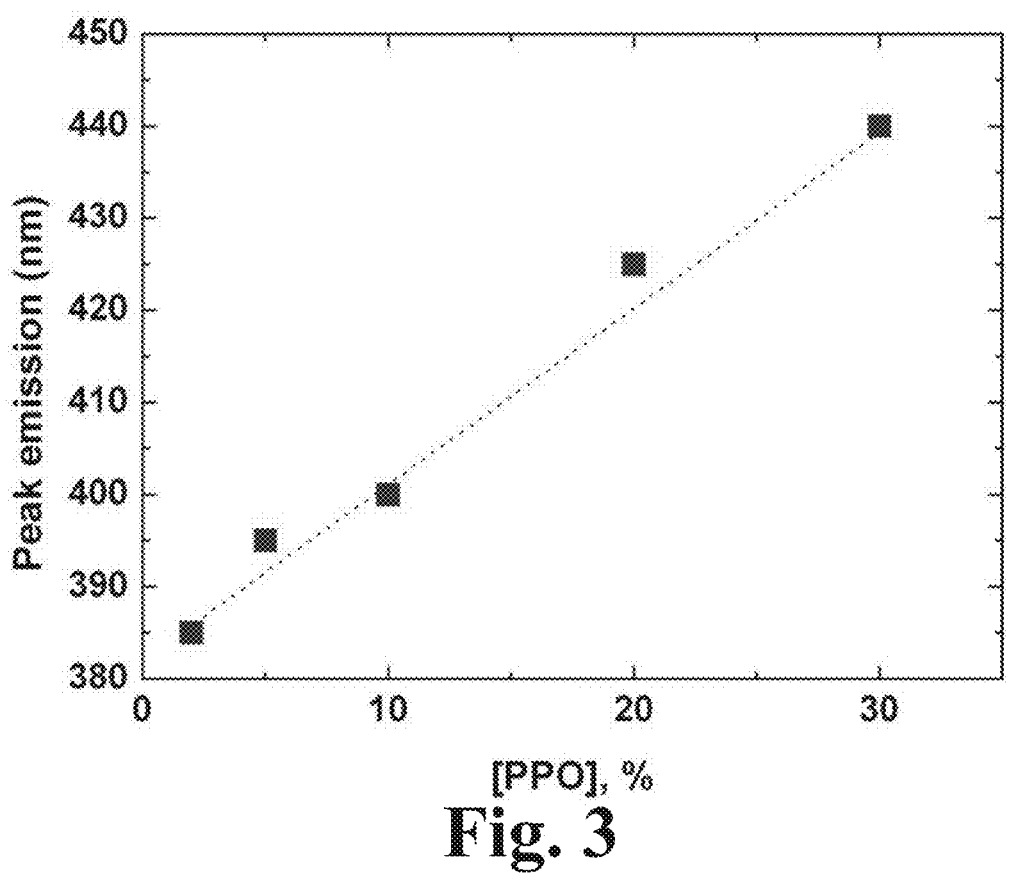
FIG. 3 is a graph of peak emission wavelength as a function of PPO concentration for a series of plastic scintillators.

Radioluminescence spectra of the plastic scintillators were measured using a Philips X-ray tube having a Cu anode operated at 40 kV and 20 mA. The scintillation light was dispersed through a McPherson 234/302 monochromator equipped with a holographic grating (1200 grooves/mm) and detected with a Hamamatsu R2059 PMT. FIG. 2 shows a typical radioluminescence emission spectrum of a polystyrene plastic scintillator with 30% PPO doping fabricated during testing. The spectrum consists of a broad emission band located between 400 and 550 nm, peaking at 440 nm. The emission is attributed to de-excitation of the PPO molecule in the plastic after excitation by ionizing radiation. Depending on the concentration of the additives and light emitter (PPO), the peak emission wavelength can be found in a range from 400-500 nm, see FIG. 3. Note how the peak emission shifts towards longer wavelengths as the PPO concentration is increased. Without wishing to be bound by theory, this red-shift of the PPO emission is assumed to be due to a self-absorption process rather than inherent to the polymer material: since the Stokes Shift of PPO is rather small (5,200 $cm^{-1}$), the probability of absorption and re-emission is relatively high and increases at higher PPO concentrations. Absorption and re-emission may occur multiple times, resulting in an emission that is shifted towards longer wavelengths. It is assumed that the energy transfer efficiency from the host polymer to PPO improves as the PPO is increased, i.e. the higher the PPO concentration, the closer the PPO molecule to the phenyl pendant group of polystyrene, the more efficient the energy transfer.

Example 3

Figure 4:
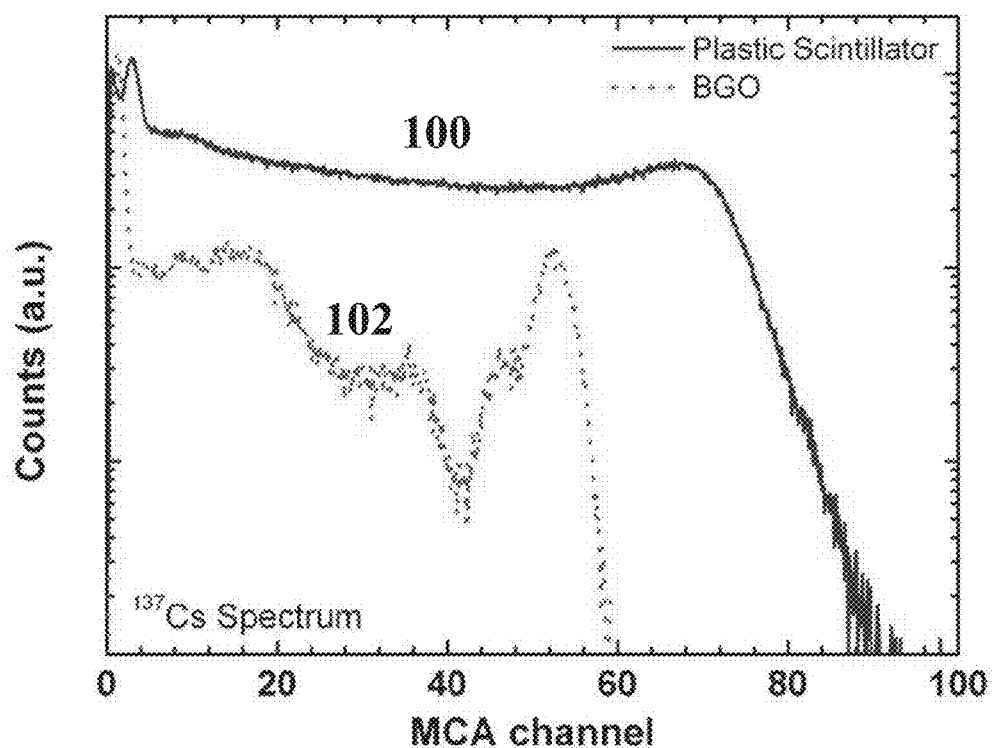
FIG. 4 is a graph of pulse height spectrum of a polystyrene plastic scintillator doped with 30% PPO compared to the spectrum of a BGO crystal.

The light output of a polystyrene plastic scintillator incorporating 30% PPO was measured by comparing their response to gamma rays with an energy of 662 keV ($^{137}$Cs) to the response of BGO. The measurement involved irradiating the plastic scintillators with 662 keV gamma-rays from a $^{137}$Cs source. The scintillation light was detected with a Hamamatsu R6231-100 PMT. The signal output of the PMT was connected to a Canberra 2005 preamplifier and a Canberra 2022 spectroscopic amplifier. The plastic scintillators were optically coupled onto the window of the PMT using Bicron BC-630 optical grease. To minimize losses in light yield, the plastics scintillators were covered with several layers of 0.1-mm thick UV reflecting Teflon tape. FIG. 4 shows the pulse height spectrum of a plastic scintillator doped with PPO 100 under $^{137}$Cs 662 keV gamma-ray excitation. To compare, the spectrum of a BGO crystal 102 is shown as well. Based on the light yield of BGO (8,200 ph/MeV), the Compton edge position in the spectrum of the plastic scintillator and BGO, and the spectral response of the system, it is estimated that the light yield of the plastic scintillator is about 13,000 ph/MeV.

Figure 5:
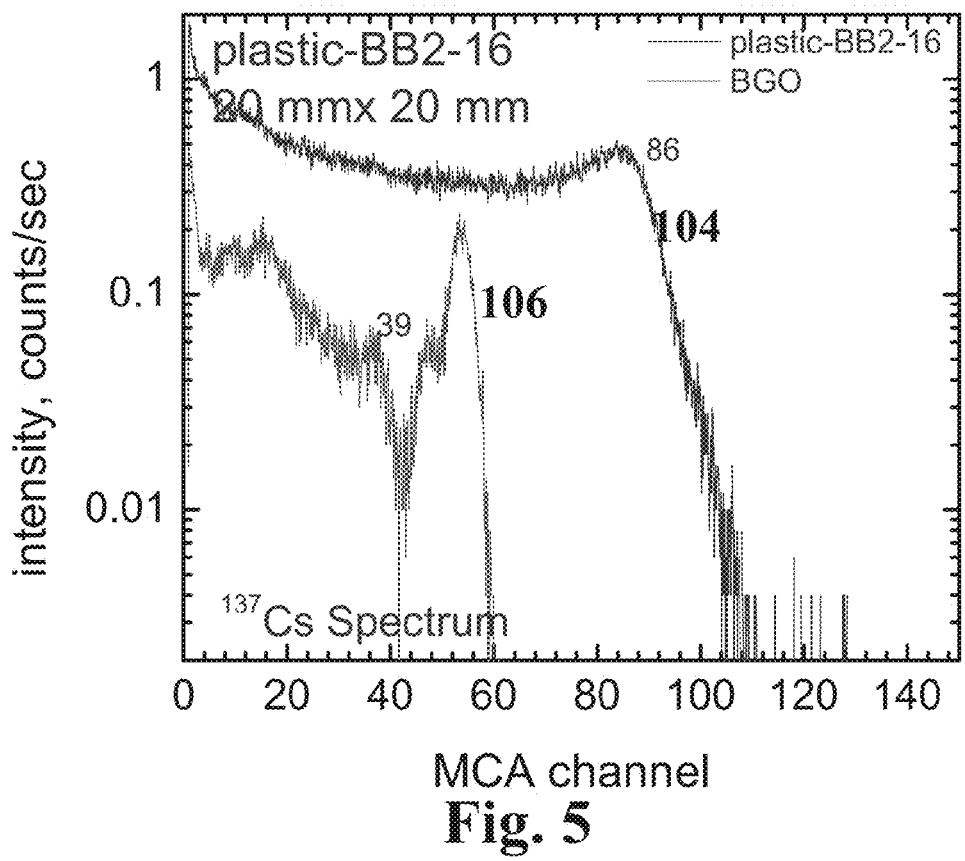
FIG. 5 is a graph of pulse height spectrum of a polystyrene plastic scintillator including with 30% PPO and 1% Divinylbenzene compared to the spectrum of a BGO crystal.

A similar comparison was also conducted for a plastic scintillator 104 incorporating 69% Styrene, 30% PPO and 1% Divinylbenzene. The plastic scintillator 104 was again compared to the response of BGO. The measurement involved irradiating the scintillators with 662 keV gamma-rays from a $^{137}$Cs source and measuring the response as above. The resulting spectra are presented in FIG. 5.

Example 4

Figure 6:
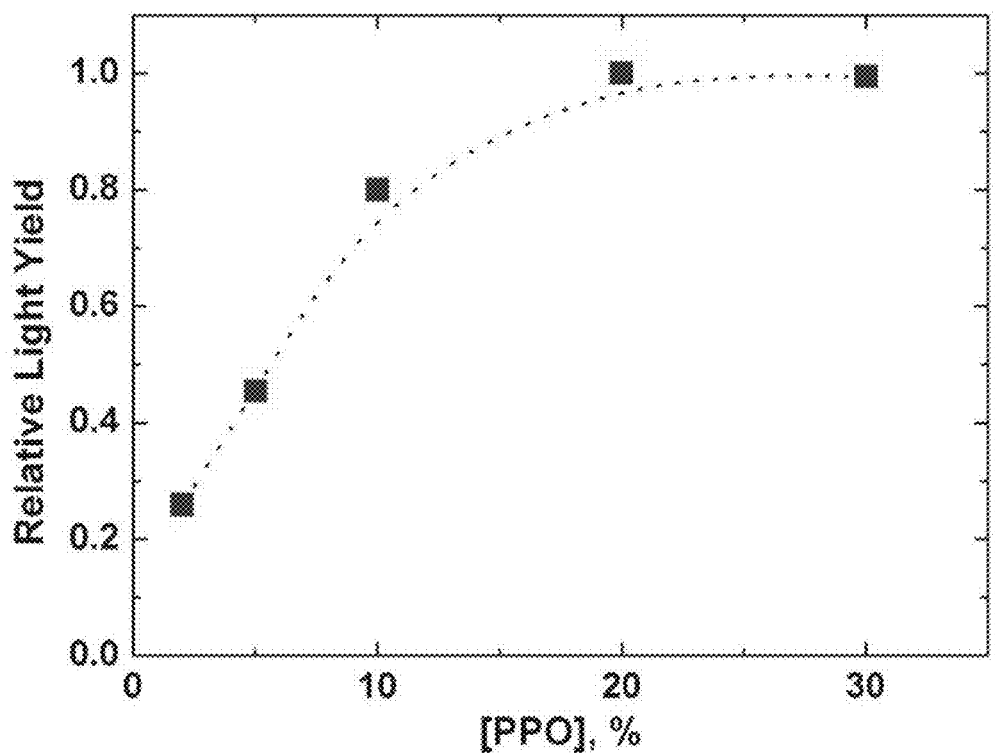
FIG. 6 is a graph of light yield as a function of PPO concentration for a series of plastic scintillators.

To investigate the effects of the additives and light emitter concentrations on the light yield of the plastic scintillators, a series of samples was fabricated over a range of concentrations. As an example, FIG. 6 shows the result for a series of plastic scintillators containing 2 to 30 weight percent PPO. As can be seen in the figure, the light yield increases with increasing PPO concentration. The maximum intensity, in the range tested, is reached at a concentration of about 30% PPO.

Example 4

Figure 7:
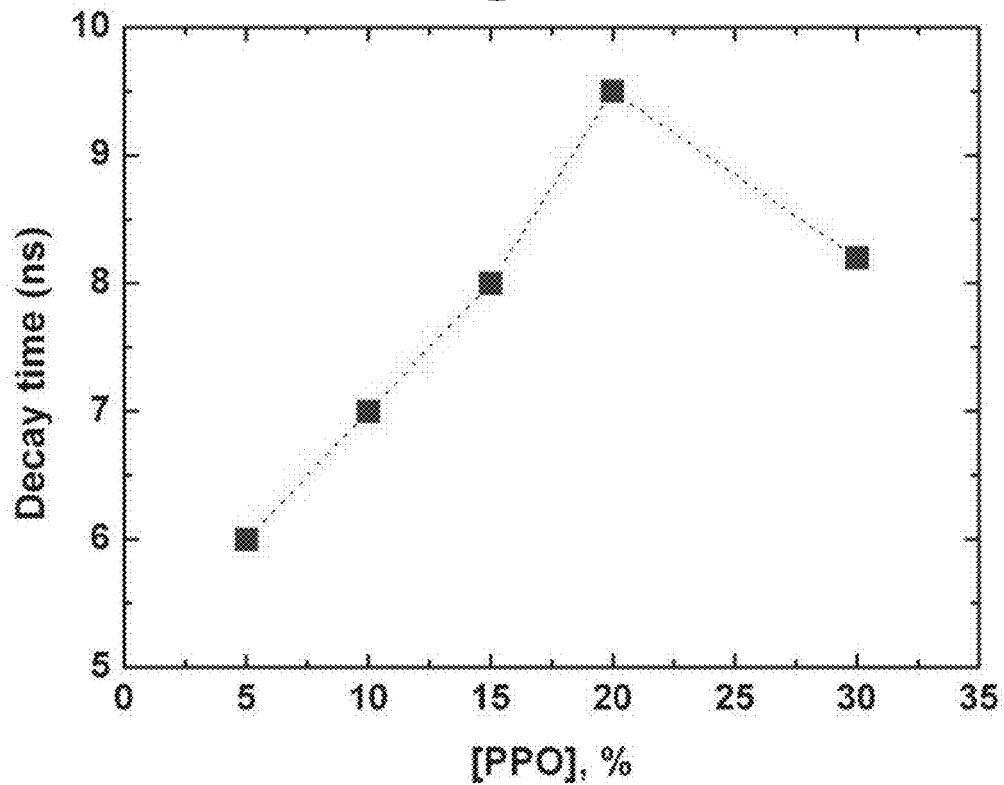
FIG. 7 is a graph of decay time as a function of PPO concentration for a series of plastic scintillators.

The scintillation time profile of the plastic scintillators was recorded in a similar manner as the light yield measurements. However, in this case the output of the PMT was directly connected to a Tektronix TDS 744A digital oscilloscope. The scintillation of the plastic scintillators doped with PPO is characterized by a very fast exponential decay with a lifetime of the order of 6-10 ns, depending on the PPO concentration. This dependence is shown in FIG. 7 where with increasing PPO concentration the lifetime of the scintillation decay component increases as well. Only for very high PPO concentrations (30%) the decay time seems to decrease again. Without wishing to be bound by theory, this effect is attributed to self-absorption or "radiation trapping" where the scintillation light emitted by PPO is absorbed and emitted again. These events may occur multiple times, leading to an increased lifetime of the scintillation light for higher PPO concentrations.

Example 5

Pulse shape discrimination (PSD) measurements were performed by collecting numerous scintillation decay time traces under gamma-ray and neutron excitation using a CEAN DT-5720 Digitizer. Collected decay traces were analyzed in order to extract information about their origin (i.e. gamma-ray or neutron). To achieve the desired discrimination, partial integration time is selected that focuses on the initial fast component. The overall integration time is selected to sum 90% of the scintillator light. These parameters can be set using the graphics user interface. The sum energy, pulse shape, and time stamp were collected in real time. Next the ratio of the two windows were plotted against the corresponding value of the full integral.

FIG. 8 compares the pulse shapes of a polystyrene plastic scintillator incorporating 10% naphthalene, 0.1% PPO and 0.1% POPOP under gamma-ray 110 and neutron excitation 108 using a $^{241}$Am/Be source. Note that the scintillation under gamma-ray excitation decays faster than that under neutron excitation. This difference forms the basis for PSD.

The sum of the energies in the two integration windows are plotted to generate a scatter a plot as shown in FIG. 9 which was obtained from another plastic scintillator incorporating 69% Styrene, 30% PPO and 1% Divinylbenzene. Note that the histograms show two distinct regions, one corresponding to the neutron events 114 and the other corresponding to gamma events 112, with good separation between the two regions. The figure of merit (FOM) for plastic scintillator with high PPO concentration (30%), as measured from the sample of FIG. 9, is shown in FIG. 10 and was calculated to be greater than 3. Considering that for traditional plastic scintillators PSD is either absent or negligible, a measured FOM of >3 for the current plastics scintillators fabricated is excellent.

Figure 11:
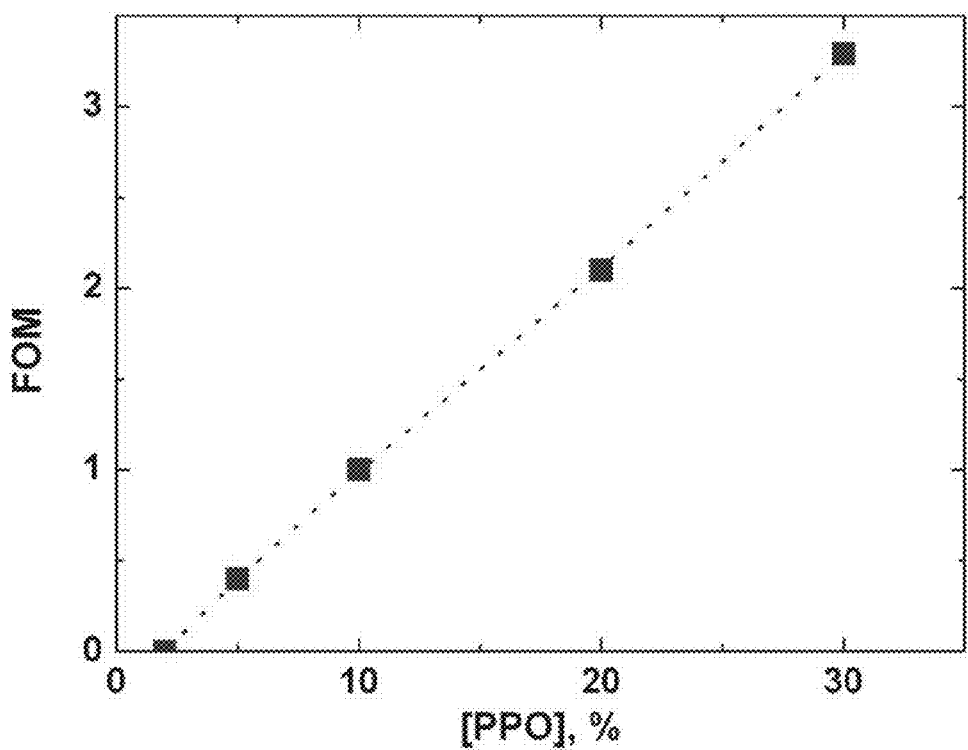
FIG. 11 is a graph of the figure of merit as a function of PPO concentration for a series of plastic scintillators.

As with the light and scintillation decay, also the FOM is dependent on the PPO concentration. This dependence is shown in FIG. 11 where with increasing PPO concentration the FOM increases as well. Without wishing to be bound by theory, at higher PPO concentrations, the increased separation between gamma-ray and neutron events (larger FOM) is related to an increased probability of triplet-triplet collisions in the plastic scintillator due to the an increase in continuous network of interacting PPO molecules. At a concentration of about 30%, this network is close to optimal.

Example 6

Figure 12:
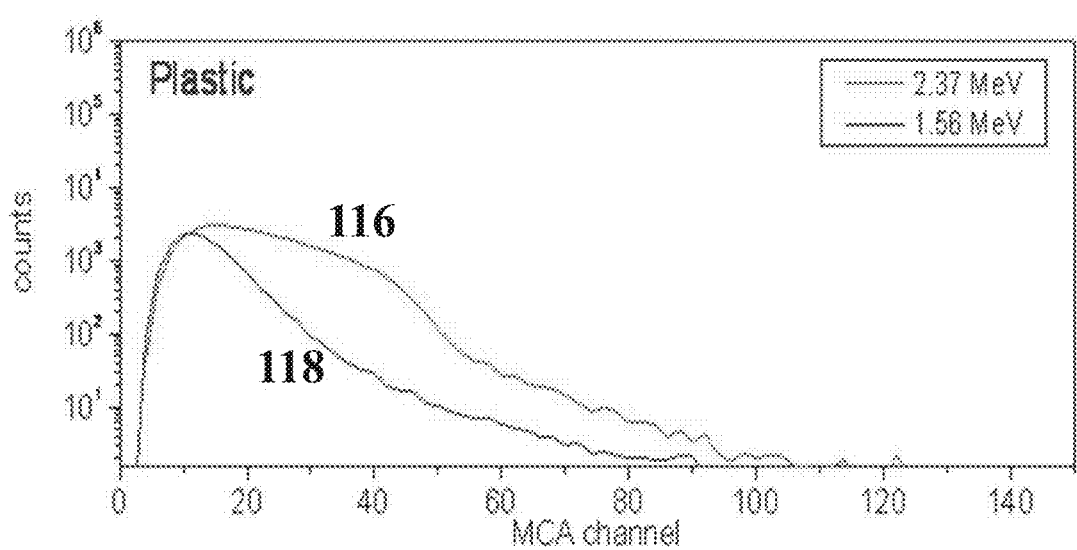
FIG. 12 is a graph of energy spectra of a plastic scintillator under fast neutron excitation with energies of 1.56 MeV and 2.37 MeV.

Plastic scintillators made using the above disclosed methods were irradiated with fast neutrons from an accelerator beam (5.5 MeV Van de Graaf). The detector response was recorded as a function of incident neutron energy to determine the ability of the scintillator to provide neutron energy information. One exemplary response is shown in FIG. 12 which shows the fast neutron energy spectra for neutron energies of 1.56 MeV (118) and 2.37 MeV (116). The gamma-ray contribution was rejected using PSD. Note how the current plastic scintillator is able to discriminate between 1.27 MeV and 2.37 MeV neutrons.

Example 7

A comparison of the properties of the plastic scintillators incorporating high concentrations of PPO with those of Anthracene, 9,10-Diphenylanthracene (DPA) and several commercially available plastic scintillators (BC-404, BC-418, and BC-422/Q) is presented in Table I below.

TABLE I

| Scintillator | Light yield (% Anthracene) | Decay (ns) | FOM |
| --- | --- | --- | --- |
| Anthracene | 100 | 10 | N/A |
| 9,10-Diphenylanthracene | 70 | <10 | 4.0 |
| BC-404 | 68 | 1.8 | N/A |
| BC-418 | 67 | 1.4 | N/A |
| BC-422/Q | 55/19 | 0.7 | N/A |
| Plastic with 2% PPO | 35 | 5.5 | <1 |
| Plastic with 30% PPO | 65 | 12 | 3.3 |

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A scintillator material comprising:
   a polymer including an aromatic ring structure;
   an oxazole, wherein the scintillator material comprises between about 10 to 40 weight percent of the oxazole; and
   a cross-linker, wherein the scintillator material comprises less than about 2 weight percent of the cross-linker, wherein the cross-linker links at least a first chain of the polymer to a second chain of the polymer.

2. The scintillator material of claim 1, wherein the oxazole is PPO.

3. The scintillator material of claim 1, wherein the scintillator material comprises between about 20 to 30 weight percent of the oxazole.

4. The scintillator material of claim 1, wherein the scintillator material comprises between about 0.001 to 2 weight percent of the cross-linker.

5. The scintillator material of claim 1, wherein the scintillator material comprises between about 0.1 to 1.0 weight percent of the cross-linker.

6. The scintillator material of claim 1, wherein the scintillator material comprises between about 0.2 to 0.4 weight percent of the cross-linker.

7. The scintillator material of claim 1, wherein the cross-linker comprises two vinyl groups.

8. The scintillator material of claim 1, wherein the cross-linker comprises an aromatic ring structure.

9. The scintillator material of claim 1, wherein the cross-linker comprises divinyl benzene.

10. The scintillator material of claim 1, wherein the polymer comprises at least one of polystyrene and vinyl toluene.

11. The scintillator material of claim 1, wherein the polymer is free of carbonyl group.

12. The scintillator material of claim 1, wherein the scintillator material composition has a figure of merit greater than about 3.

13. A system for detecting radiation, comprising:
  a detector comprising a scintillator material comprising a polymer including an aromatic ring structure, an oxazole, and a cross-linker, wherein the scintillator material comprises between about 10 to 40 weight percent of the oxazole, wherein the scintillator material comprises less than about 2 weight percent of the cross-linker, and wherein the cross-linker links at least a first chain of the polymer to a second chain of the polymer; and
  a light detector assembly coupled to the scintillator material to detect a light pulse luminescence from the scintillator material.

14. A method of radiation detection, comprising:
providing a detection system comprising:
  a scintillator material comprising a polymer including an aromatic ring, an oxazole, and a cross-linker, wherein the scintillator material comprises between about 10 to 40 weight percent of the oxazole, wherein the scintillator material comprises less than about 2 weight percent of the cross-linker, and wherein the cross-linker links at least a first chain of the polymer to a second chain of the polymer; and
  a detection assembly coupled to the scintillator material to detect a light pulse luminescence from the scintillator as a measure of a scintillation event;
positioning the system such that a radiation source is within a field of view of the system so as to detect emissions from the source; and
measuring a scintillation event luminescence signal from the scintillator material with the detection assembly.

15. The method of claim 14, further comprising processing the measured luminescence signal using pulse shape discrimination analysis to differentiate between gamma emissions and neutron emissions from the source.

16. The method of claim 14, wherein the signal processed with pulse shape discrimination analysis has a figure of merit greater than about 3.

* * * * *